(No Model.) 2 Sheets—Sheet 1.

N. BARRY, Jr.
WATER CLOSET.

No. 293,935. Patented Feb. 19, 1884.

Witnesses:

Inventor:
N. Barry Jr.
by T. H. Alexander
Attorney.

(No Model.) 2 Sheets—Sheet 2.

N. BARRY, Jr.
WATER CLOSET.

No. 293,935. Patented Feb. 19, 1884.

Witnesses:

Inventor:
N. Barry Jr.
by
F. H. Alexander
Attorney.

UNITED STATES PATENT OFFICE.

NICHOLAS BARRY, JR., OF MUSCATINE, IOWA.

WATER-CLOSET.

SPECIFICATION forming part of Letters Patent No. 293,935, dated February 19, 1884.

Application filed May 10, 1883. (No model.)

*To all whom it may concern:*

Be it known that I, NICHOLAS BARRY, Jr., of Muscatine, in the county of Muscatine and State of Iowa, have invented certain new and useful Improvements in Water-Closets; and I do hereby declare that the following is a full, clear, and exact description thereof, reference being had to the accompanying drawings, and to the letters of reference marked thereon, which form part of this specification, in which—

Figure 1:
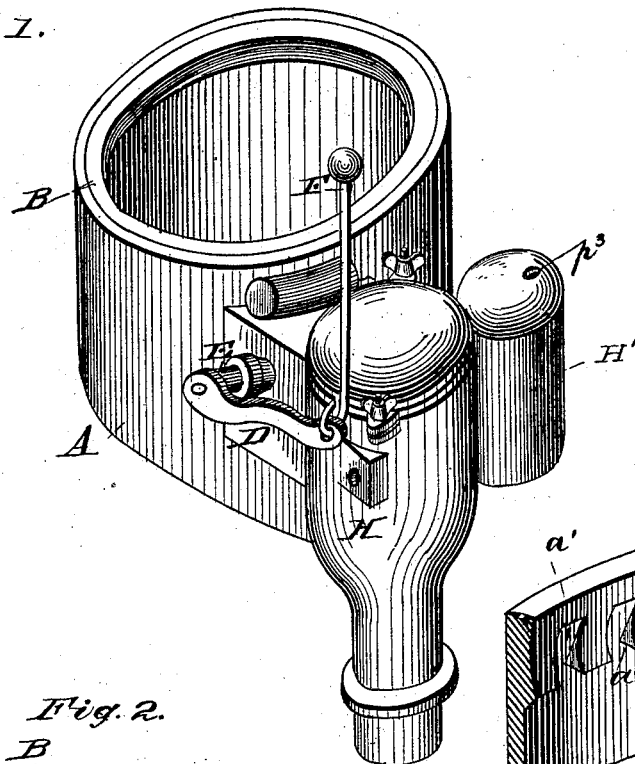
Figure 4:
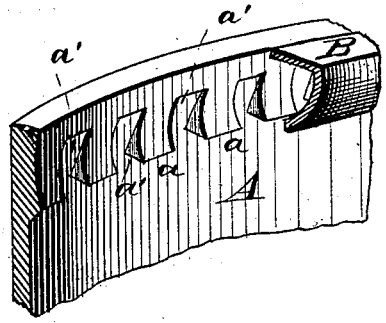
Figure 2:
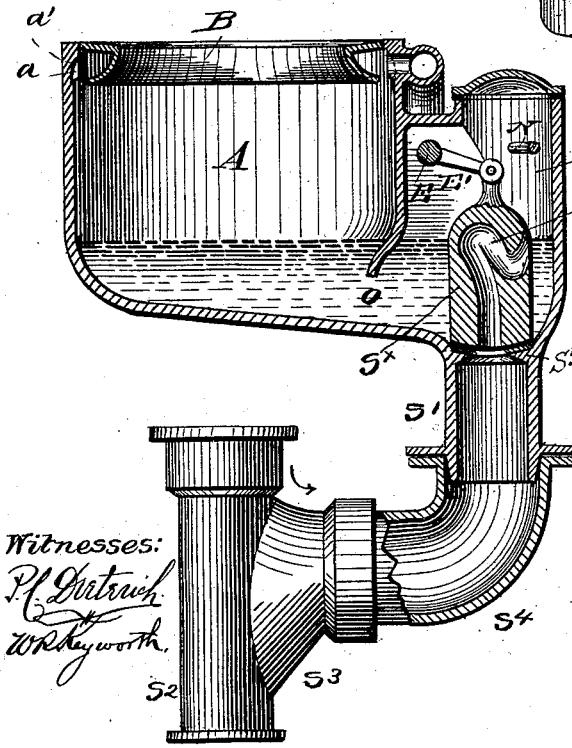
Figure 3:
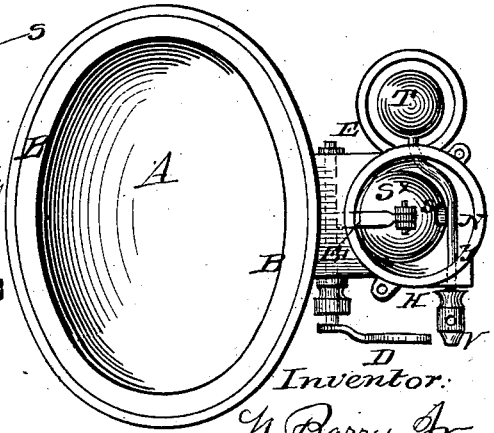
Figure 5:
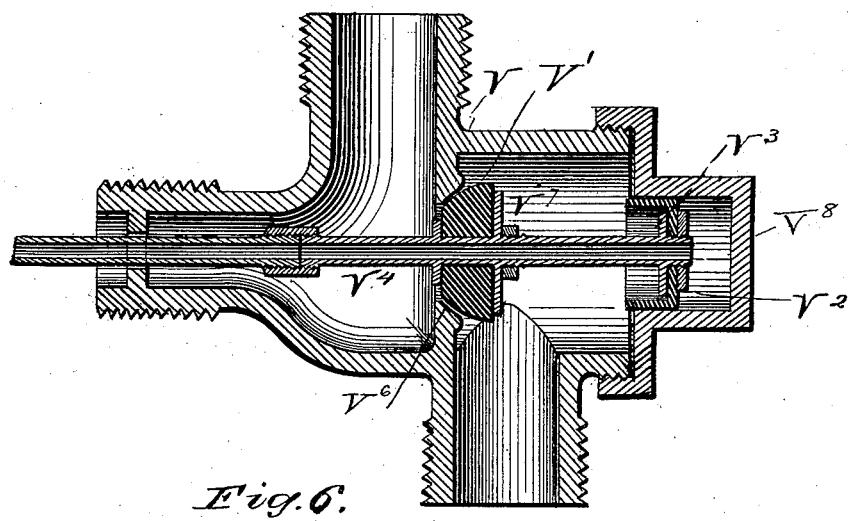
Figure 6:
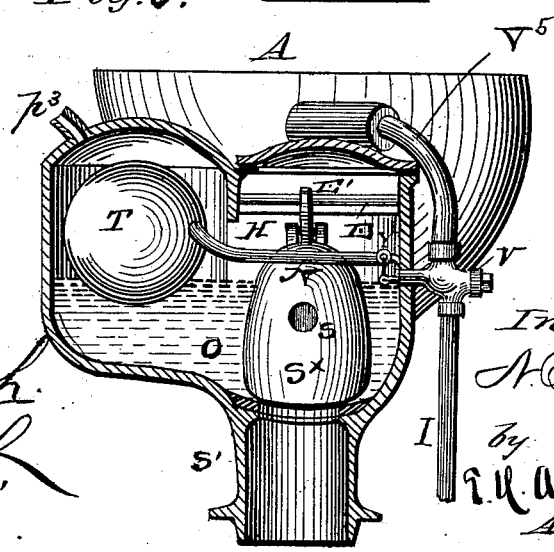

Figure 1 is a perspective view of the basin and its attachments, the V-shaped soil-branch being omitted; Fig. 2, a vertical sectional view through the basin and a full view of the V-shaped soil-pipe which leads to the sewer and also to the gas-outlet. Fig. 3 is a top view of the basin with the caps of the side chambers removed to show the valve $S^x$ and the float. Fig. 4 is a sectional detail of the basin, showing the ribs which distribute the water in the basin. Fig. 5 is a vertical diametrical section of the trap-valve; and Fig. 6 is a vertical sectional view, through the chambers at the back of the basin, showing the water-inlet pipe, the valve therein, and the pipe communicating with the distributing-chamber of the basin.

This invention relates to certain improvements in water-closet basins; and it has for its objects to provide improved means for distributing and regulating the flow of water through the same, as more fully hereinafter specified.

The letter A designates the basin of the water-closet, and B an annular hollow chamber at the upper inner edge of the same, the internal wall of which flares toward the sides of the basin, a space being left between its edge and said sides for the admission of water into the basin, as more fully hereinafter specified. The internal sides or walls of the vessel near the top, and forming part of the annular chamber, are formed with broad curved ribs $a$, having intervening spaces $a'$, by means of which the current of water flowing into the basin is broken up and distributed in separate streams or ripples into the basin, so as to quickly absorb foul vapors and gases and carry the same off mechanically from the basin. The basin is constructed with a slanting bottom, and at its lowest point is provided with an aperture, O, leading to an air-tight chamber, H, which communicates, by means of a tubular extension or pipe, $S'$, and elbow $S^4$, with a soil-pipe, $S^2$, which has a flaring connecting side branch, $S^3$, as indicated in Fig. 2 of the drawings. Within the said chamber H is located a valve, $S^x$, which sits normally upon a valve-seat, $S^y$. The said valve is hung to one end of an arm, $E'$, which is secured to a short shaft, E, passing through a stuffing-box at one side of the chamber H, the said shaft at its outer end having an arm, D, to which is connected the vertical operating-rod F. The valve is provided with a tortuous passage, S, as indicated in Fig. 2 of the drawings, for the purpose hereinafter specified. At one side of the chamber H is located a chamber, $H'$, which communicates with the said chamber H, so that the water will rise to the same level in both. In said chamber is located a float, T, which is secured to one arm of an angle-lever, N, fulcrumed at Y to a bracket in the interior of the chamber H, the other arm of said lever being connected with a valve-rod, $V^4$, extending in the valve-chamber V on the outside of the chamber H. The said valve-chamber connects with the annular chamber at the top of the basin by means of a pipe, $V^5$, and with a water-service pipe, I, as plainly shown in Fig. 6 of the drawings, and the said chamber is provided with a valve-opening and seat, $V^6$, against which seat is normally seated a valve, $V^7$, on the valve-rod $V^4$, which rod extends back into a chamber, $V^8$, the said rod having secured to its end a guide-piston, $V^9$, by means of a screw-nut, $V^2$, the said piston traveling in the said guide-chamber, the rod $V^4$ being made hollow to permit the air to enter and escape from the chamber $V^8$ as the valve V moves back and forth, so as to permit it to operate freely. The chamber $H'$ is provided with a vent, $p^3$, which connects with a suitable flue, to permit of the discharge of air from the chambers and allow the water to seek its proper level. The pipe $S^2$ extends up to the roof of the building, to permit the escape of foul air or gases, the flaring connection $S^3$ allowing the gases to escape freely upward into the said pipe as the contents of the basin flow into the same. The top of the chamber H is made removable, so that ready access may be had to the same, and the chamber $V^8$ is also made removable for a similar purpose.

The operation of my invention is as follows: Upon elevating the valve $S^x$ to discharge the contents of the basin the same flows out through the pipe $S'$. This allows the float T to drop, opening the valve V, and permitting the water to flow into the annular chamber B, and from thence in divided currents or "ripples" into the basin, thoroughly flushing it. When the valve $S^x$ closes, the water gradually fills the basin to its proper level. In case the valve V should leak, the overflow passes off through the passage S in the valve $S^x$, which passage is normally "trapped" by the water to prevent sewer-gas and odors from backing up into the basin and escaping into the closet.

Having thus described my invention, what I claim, and desire to secure by Letters Patent, is—

1. The combination of a water-closet basin having broad ribs at the upper edge, curved inwardly with intervening spaces, and the flaring internal wall forming an annular chamber, and an inlet-pipe, whereby water is supplied and distributed to the basin in separate currents or ripples, substantially as specified.

2. The combination, with the basin A, and chamber H at one side, of the valve $S^x$, located therein, and the mechanism for operating the same, the communicating chamber H, the float T, rod H, and angle-lever connecting with the hollow valve-rod $V^4$, the valve-chamber V, and guided valves $V'$, and the supply-pipe, all arranged to operate substantially in the manner specified.

3. The combination, with the basin A, the chambers H H', and the float T, valve $S^x$, and hollow valve-rod $V^4$, and valve $V'$, of the guide-chamber $V^8$ and piston-guide $V^3$, the whole adapted to operate substantially in the manner specified.

4. The combination, with the air-tight chamber H, of the basin A, the discharge-valve $S^x$, and the float-chamber H' and float T, the float-chamber being provided with a vent, $p^3$, substantially as and for the purposes set forth.

In testimony that I claim the foregoing as my own I affix my signature in presence of two witnesses.

NICHOLAS BARRY, JR.

Witnesses:
GEO. W. SMALLEY,
LUTHER M. WOODS.